United States Patent [19]

D'Entremont

[11] Patent Number: 5,659,652

[45] Date of Patent: Aug. 19, 1997

[54] SUPPORT SYSTEM FOR RAPID ASSEMBLY OF COMPONENT INFRASTRUCTURES

[76] Inventor: Joseph P. D'Entremont, 1 Green Glade Ct., Phoenix, Md. 21131

[21] Appl. No.: 536,213

[22] Filed: Sep. 29, 1995

[51] Int. Cl.⁶ .................. G02B 6/00; B23Q 1/25; F16L 3/00
[52] U.S. Cl. .................. 385/147; 385/52; 385/136; 385/137; 269/76; 269/37; 269/45; 269/329; 248/73
[58] Field of Search .................. 385/52, 53, 54, 385/55, 76, 77, 100, 101, 134, 136, 137, 147; 269/1, 37, 45, 76, 86, 95, 329; 248/466, 73

[56] References Cited

U.S. PATENT DOCUMENTS

| | | | |
|---|---|---|---|
| 2,493,435 | 1/1950 | Archambault | 273/459 X |
| 4,072,432 | 2/1978 | Levy | 403/170 |
| 4,147,405 | 4/1979 | Spainhour | 385/137 X |
| 4,557,554 | 12/1985 | Blanc | 385/136 X |
| 4,744,627 | 5/1988 | Chande et al. | 385/137 X |
| 4,842,537 | 6/1989 | Villiers | 439/246 |
| 5,281,884 | 1/1994 | Basavanhally et al. | 385/137 X |
| 5,337,378 | 8/1994 | Saito et al. | 385/137 X |
| 5,422,725 | 6/1995 | Vihelmsson | 385/52 X |
| 5,446,808 | 8/1995 | Kuzyk et al. | 385/147 X |
| 5,448,662 | 9/1995 | Kittell et al. | 385/137 X |
| 5,450,245 | 9/1995 | Grotzinger et al. | 385/52 X |

*Primary Examiner*—Brian Healy
*Attorney, Agent, or Firm*—Royal W. Craig

[57] ABSTRACT

A system for fast, efficient assembly of mechanical component support infrastructures based on a set of interlocking rods and/or tubes and supporting blocks, each block supporting at least two rods/tubes in a precision configuration. The blocks and rods are formed in a particular relative size and shape to allow them to be assembled quickly and easily into a wide variety of configurations, all capable of providing a highly stable and precision infrastructure for supporting equipment in lab and bench setups.

19 Claims, 7 Drawing Sheets

SUPPORT SYSTEM FOR RAPID ASSEMBLY OF COMPONENT INFRASTRUCTURES

BACKGROUND OF THE INVENTION

1. Field of the invention

The present invention relates to general purpose component/equipment support systems and, more particularly, to a universal system of interlocking blocks and rods or tubing for allowing rapid prototyping of test assemblies, lab bench setups and other equipment infrastructures.

2. Description of the Background

During any experiment or project in basic or applied research, product development or assembly management, a preliminary and final test setup is required. These test setups inflate product development costs due to the material costs and man-hours that go into modeling and prototyping. Bench fixtures, components and equipment often need to be installed on a specific infrastructure and with tight tolerances. Traditionally, these infrastructures needed to be custom designed, custom manufactured, and permanently assembled. This required a separate design facility (e.g., CAD design), a manufacturing facility, and an assembly facility. For example, FIG. 1 illustrates a conventional optical bench test setup in which a laser is transmitted to a mirror at point A, is reflected to a mirror at point B, then to another at point C, another at point D, and is finally reflected outward from the setup. Each mirror must be adjustable, yet capable of being precisely fixed in position. In order to facilitate the necessary adjustments yet maintain the proper tolerances, each component of the supporting infrastructure must be custom designed, manufactured and assembled. The cost is enormous and unduly inflates the ultimate product cost. Moreover, significant time is wasted waiting for custom parts and fixtures and in assembling the experimental infrastructure. Once assembled, the custom fixtures do not lend themselves to modification and re-tooling. Any changes to the infrastructure sends it back to the design facility where the process must be repeated. Traditionally, an extraordinarily large portion of the ultimate product cost was devoted to the test infrastructure. But these single-purpose (task-specific) custom fixtures usually have no usefulness after the product development stage and are discarded.

Clearly, there would be great economies in a universal system which could increase productivity and reduce costs by allowing such fixtures, models and prototypes to be assembled in a short time from a small inventory of standardized parts, thereby shortening the design and fabrication lead time and expense, and allowing easy modification, adjustment and re-tooling.

Of course, the broader concept of construction via standard components has been used in other unrelated applications. For example, U.S. Pat. No. 2,493,435 issued to Archambault is directed to a set of toy building blocks (see column 1, lines 3, 4). The fundamental units of the Archambault system are cubes (see column 2, lines 23, 24, 25), and interfitting rods that "hold together a structure built from the blocks" (column 5, lines 28, 29). The rods are secured to the cubes by a frictional fit, and a fabricated structure will appear as an assembly of interfaced cubes with hidden rods. This is targeted for entirely different application. The rod and cube layout and dimensions are not calculated to provide a framework to support anything, and the system is not capable of providing reliable nor adjustable support for equipment.

Nevertheless, it would be greatly advantageous to carry the concept over into equipment support infrastructures. With structural modifications and refinements, this goal is herein achieved to provide a universal system capable of allowing fixtures, models and prototypes to be assembled in a short time from a small inventory of standardized parts. Design and fabrication times can be slashed, and easy modification, adjustment and re-tooling becomes possible.

SUMMARY OF THE INVENTION

It is, therefore, an object of the present invention to provide a cost effective system for building equipment infrastructures including an array of standardized parts to facilitate, for example, any of the following:

Rapid prototyping of equipment infrastructures;

Cost effective prototyping which eliminates the need to use a design and manufacturing facility (and associated support personnel) to construct a test setup;

Recyclable bench test setups for optical and other applications;

Precision scientific test assemblies with tight tolerances;

Flexible engineering design test assemblies that can be easily modified and adjusted;

Fixturing;

Accessory mounting;

Laboratory prototype test setups;

Assembly line monitoring setups.

According to the present invention, the above-described and other objects are accomplished by providing a unique system of interlocking blocks and rods or tubes for rapid assembly of component infrastructures. The rods or tubes each have a uniform circular cross-section. The blocks (for interlocking the rods/tubes) each have at least two evenly-spaced coaxial through-holes. The blocks have at least two additional evenly-spaced and parallel through-holes penetrating each block in a direction transverse to the other through-holes, all through-holes being sized to each frictionally receive one of the rods/tubes. In addition, there is at least one central tapped or clearance hole penetrating each block for allowing pairs of blocks to be pivotally secured together by a assembly screw, bolt or the like.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENTS

The present invention is a unique system of interlocking support blocks and rods or tubes for rapid assembly of component infrastructures.

Figure 2:
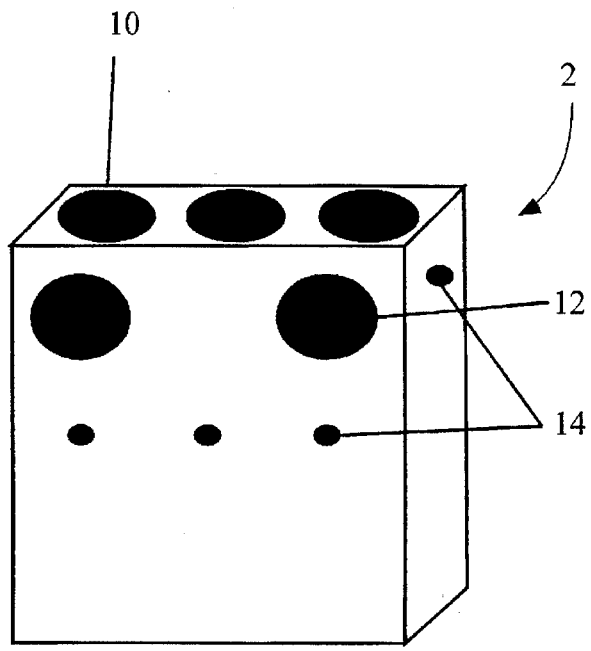
FIG. 2 is a perspective view of one embodiment of a block according to the present invention.

FIG. 2 shows an exemplary support block 2 formed, for example, from a 2"×2"×¾" unit of aluminum, brass, plastic or other suitable material.

Each such block 2 of the system is formed by machining, drilling, molding, or casting with one of a group of function-specific hole arrangements.

Figure 3:
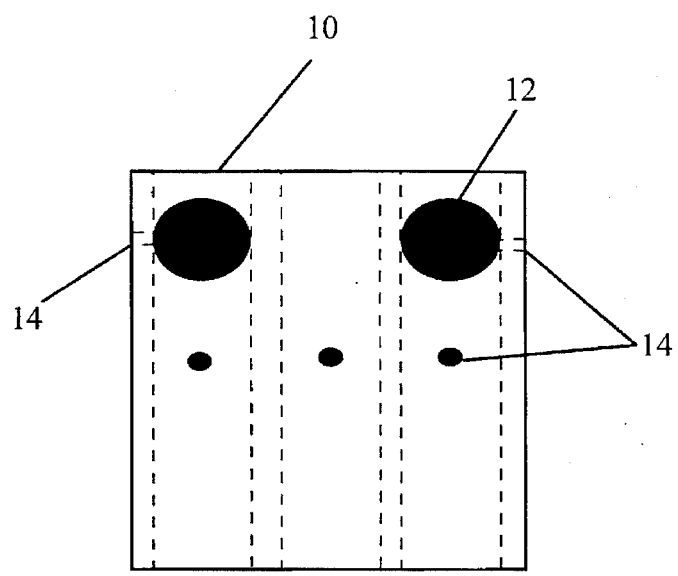
FIG. 3 is a front view of the block of FIG. 2 with dotted lines showing interior through-holes.
Figure 4:
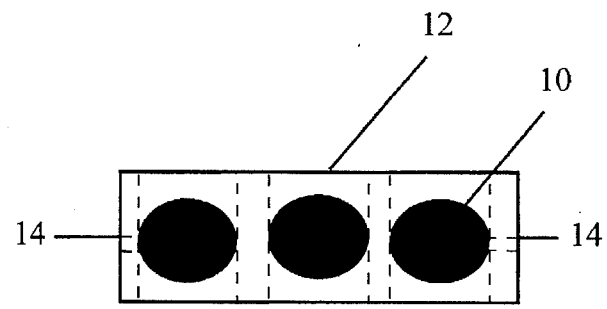
FIG. 4 is a top view of the block of FIG. 2 with dotted lines showing interior through-holes.

As seen more clearly in conjunction with FIGS. 3 (front view) and 4 (top view), the hole arrangements include a first set of three through-holes 10 penetrating block 2 lengthwise (shown in dotted lines in FIG. 3), and a second set of two through-holes 12 penetrating said block 2 through its width (transverse to the first set of through-holes). In addition, a third set of smaller tapped holes 14 entering each block 2 and arranged for retaining said rods 20 by set screws or the like.

Both of the first set of through-holes 10 and second set of through-holes 12 are of a uniform diameter selected in order to frictionally receive the rods or tubes of the system (to be described), and this diameter may be as large as needed without compromising the structural integrity of the blocks. For the 2"×2"×¾" blocks shown in FIGS. 23, a ½" diameter hole is preferred. This allows a ⅛" spacing between adjacent holes and a ⅛" clearance from the ends of the block, quite sufficient to insure that the structural integrity of the block 2 is not compromised. The first set 10 and second set 12 of holes allow the blocks to be interconnected and otherwise supported or joined by means of rods or tubes (to be described).

The third set of tapped holes 14 are for standard assembly screws (not shown). The assembly screws are important for securing rods 20 or tubes 25 to blocks 2 to provide a sturdy and reliable infrastructure.

Of course, it is contemplated that the blocks 2 may differ from the above-described standard by scaling them in size or by sectioning them. Examples include, but are not limited, to larger or smaller basic blocks, blocks cut in half through any of the three axes, blocks cut in thirds crosswise or lengthwise, or quartered crosswise. The blocks may be sectioned in virtually any manner that does not compromise their structural integrity. The following is a scaling chart that illustrates a typical dimensional relationship between holes and block size in order to maintain the functionality of the block system:

| Block Width | Length | Thickness | Hole Diameter |
|---|---|---|---|
| ∞ | ∞ | ⅜ × ∞ | ½ × ∞ |
| 2" | 2" | 0.75" | 0.5" |
| 1" | 1" | 0.375" | 0.25" |
| 0.5" | 0.5" | 0.25" | 0.125" |

In addition, an exemplary sectional clamping-type block is herein described.

Figure 5A:
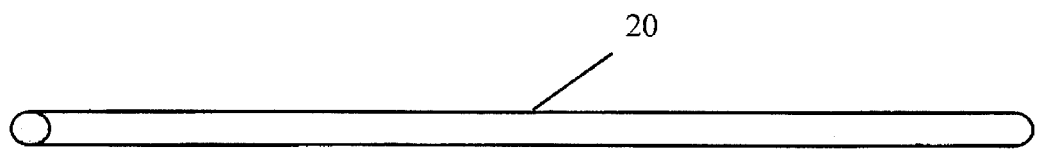
FIG. 5A is one embodiment of a rod according to the present invention.
Figure 5B:
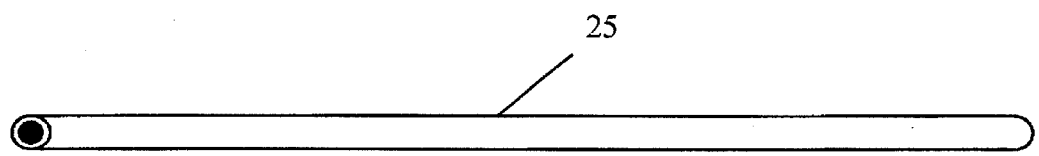
FIG. 5B is a tube which may be substituted for the rod of FIG. 5A.

FIG. 5A illustrates an exemplary rod 20, and FIG. 5B shows a tube 25 which my be substituted for the rod of FIG. 5A. Both rod 20 and tube 25 may be formed of steel, brass, aluminum, plastic or other suitable material, as appropriate. Tubes 25 are preferred in certain applications, for example, in lightweight applications or when fluid carrying capabilities are required. Generally, tubing 25 may be used as required to facilitate the transfer of gas, liquid, solid or vacuum. It is also contemplated that the rods may be replaced by fiber optic material to convey ultraviolet, light or infrared energy. Similarly, in some electrical applications the tubes 25 may serve as conduits for electrical cables. For fluid applications the tubes 25 may be PVC or glass tubing to accommodate fluid flow. The length of rods 20 or tubes 25 are chosen as needed for a specific application.

The blocks 2 may be secured to the rods 20 or tubes 25 with set screws made of plastic, brass, steel, or other materials placed in tapped holes 14.

Figure 6:
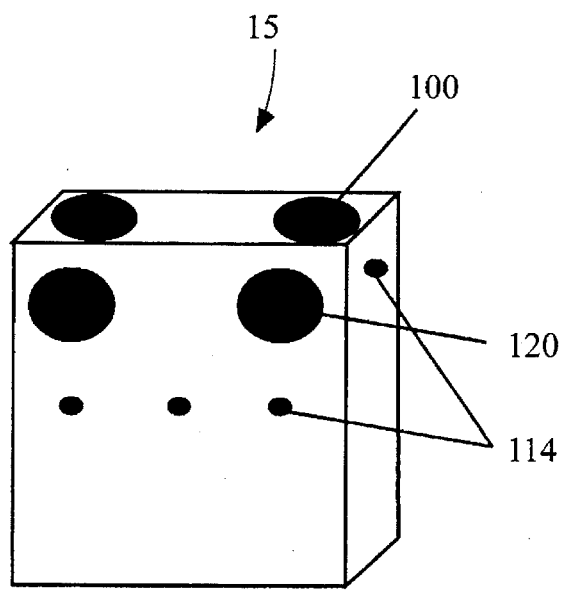
FIG. 6 is a perspective view of a second embodiment of a block according to the present invention.

FIG. 6 shows an alternative support block 15 likewise formed from a 2"×2"×¾" unit of aluminum, brass, plastic or other suitable material. In this case, the hole arrangements include a first set of two through-holes 100 penetrating block 2 lengthwise, and a second set of two through-holes 120 penetrating said block 2 through its width (transverse to the first set of through-holes). As before a ½" diameter hole is preferred.

Figure 7:
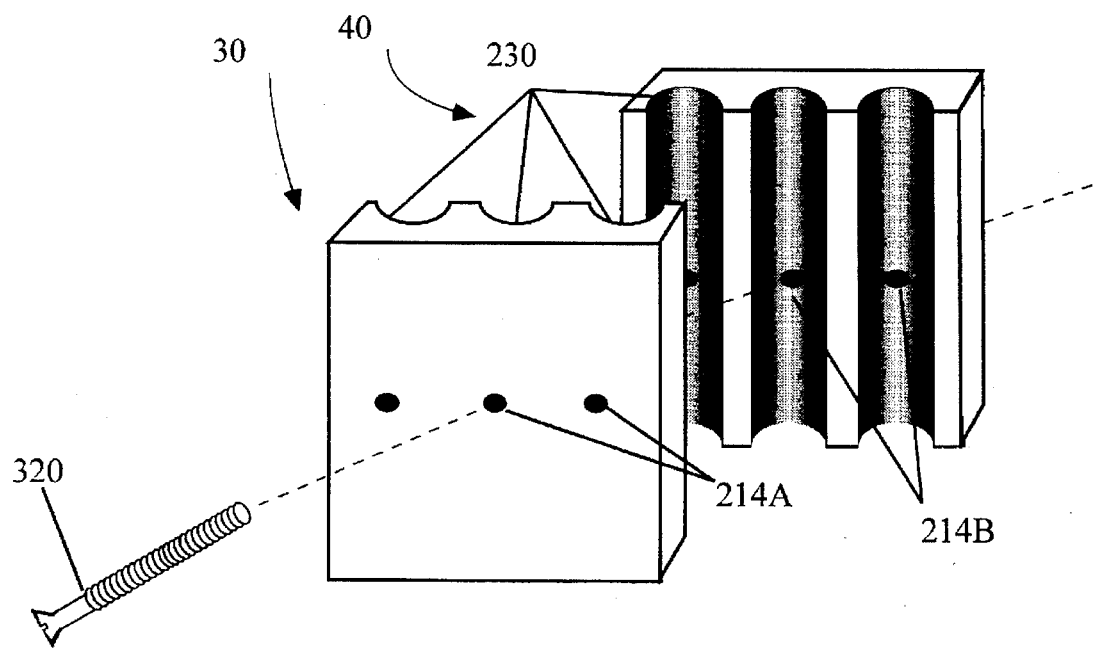
FIG. 7 is a perspective view of a third embodiment of a sectional block according to the present invention.

FIG. 7 shows an exemplary sectional clamping block formed from two 2"×2"×0.25" sections 30 and 40 of aluminum, brass, plastic or other suitable material. The two sectional units 30 and 40 are identical and are essentially outside quarter (¼) sections of block 2 without transverse holes 12. As a general constraint, sectional units 30 and 40 must be significantly less than a half (½) section of block 2. The hole arrangements include a set of three tapped holes 214A passing through section 30, and a set of three clearance holes 214B passing through section 40. In addition, the opposing faces of both sections are defined by a set of three parallel quarter-cylindrical channels 230 extending across each of said blocks. Channels 230 are of a uniform diameter selected to closely seat the rods 20 or tubes 25 of the system. For the 2"×2"×0.25" blocks shown in FIG. 7, a ½" diameter channel is preferred.

Figure 8:
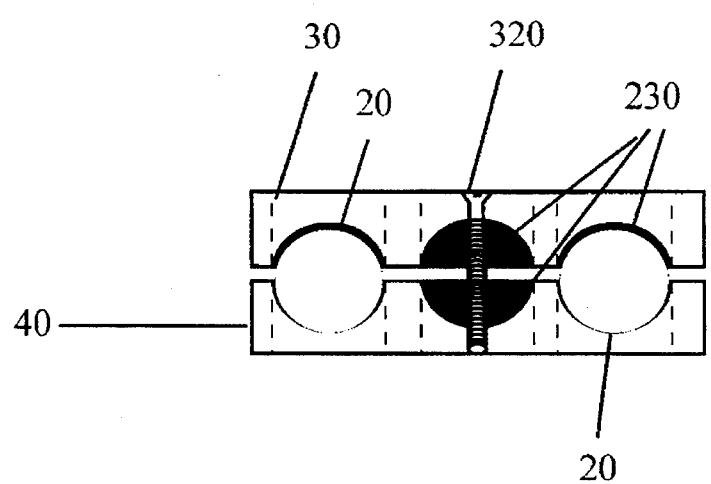
FIG. 8 is a top cutaway view of the sectional block of FIG. 7 with exposed assembly screw mating the two sections.

FIG. 8 illustrates a cutaway view of block sections 30 and 40 clamped together by assembly screw 320 and securely clamps rods 20 therebetween. An assembly screw 320 is inserted through clearance holes 214B and is tightened using tapped holes 214A in order to clamp/sandwich the opposing sections 30 and 40 together, and to sandwich the rod(s)/tube (s) therebetween. Again the block sections 30 and 40 may differ from the above-described standard by scaling them in size, or by further sectioning them.

Figure 9:
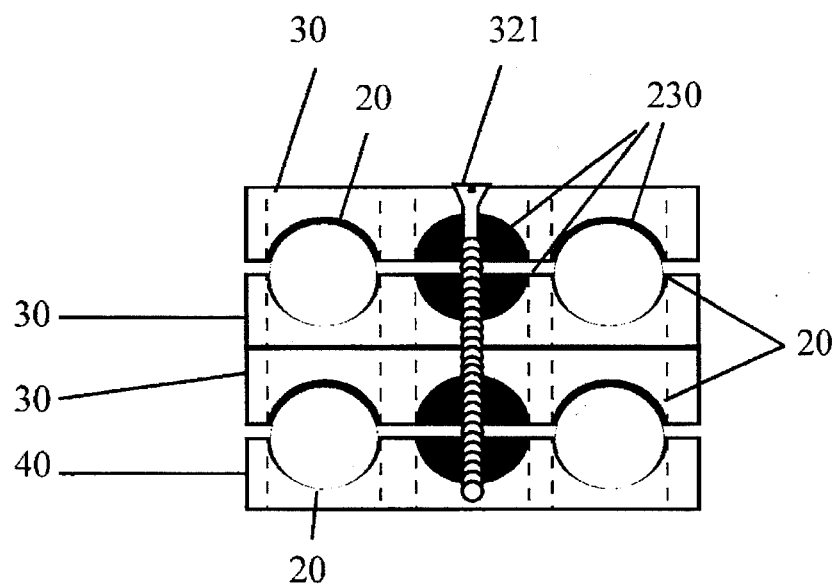
FIG. 9 is a top cutaway view of two sectional blocks as in FIG. 7 with exposed assembly screw mating the two sections of each block as well as the two blocks.

FIG. 9 illustrates a cutaway view of two sets of identical block sections 30 and 40 clamped together by an elongate assembly screw 321 for pivotal rotation. In this case the assembly screw 321 is of sufficient length to penetrate four adjacent block sections 30-30-30-40.

The following is a typical scaling chart for the sectional blocks 30,40 of FIGS. 8 and 9 that illustrates the dimensional relationship between channels and section size in order to maintain functionality according to the present invention:

| Section Width | Length | Thickness | Channel Diameter |
| --- | --- | --- | --- |
| ∞ | ∞ | .125 × ∞ | ¼ × ∞ |
| 2" | 2" | 0.25" | 0.5" |
| 1" | 1" | 0.125" | 0.25" |
| 0.5" | 0.5" | 0.083" | 0.125" |

There are many contemplated applications for the system of the present invention. The system is capable of forming a precision infrastructure for the support of many setups. Again, rods 20 may be replaced by tubes 25 capable of conveying liquids and gases in various chemical or medical applications. Tubes 25 may also serve as electrical conduits. Likewise, the blocks are also capable of supporting electrical wires for electrical applications, or optical fibers in data communication contexts.

Figure 1:
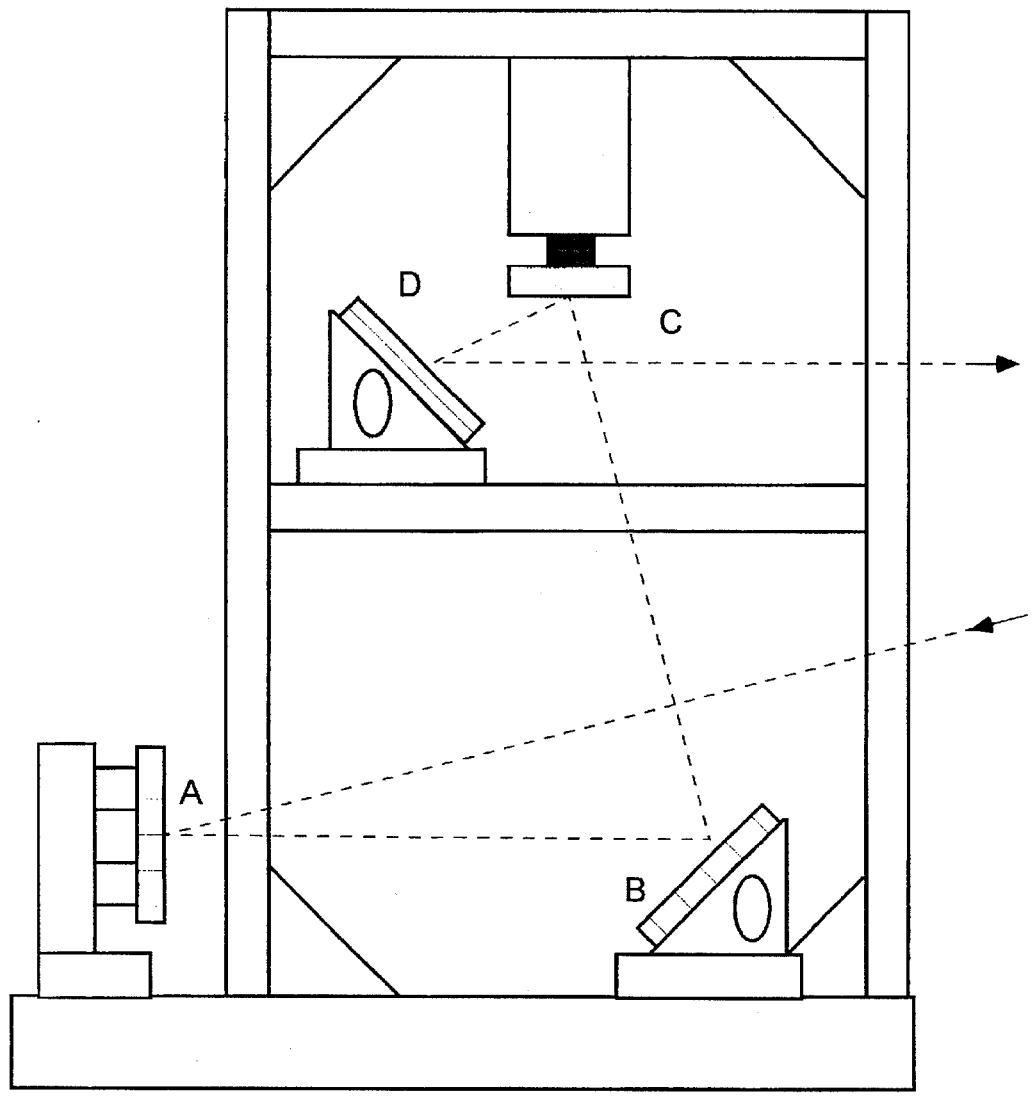
FIG. 1 is a typical optical bench test setup using a custom support structure.
Figure 10:
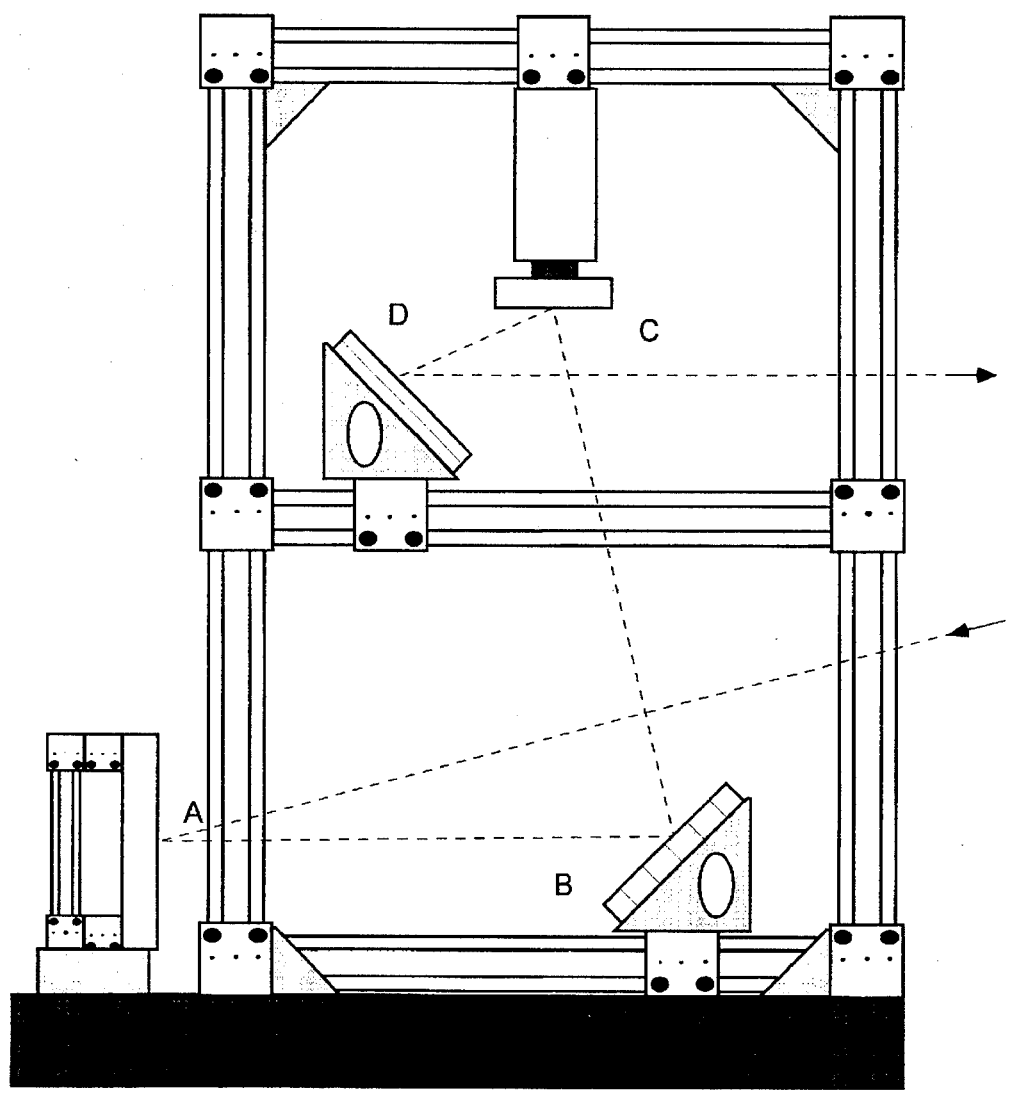
FIG. 10 is a front view of the application of the present invention to the optical bench test setup of FIG. 1.

FIG. 10 illustrates one exemplary rapid prototype, cubical infrastructure for supporting the optical setup shown in FIG. 1. To construct the FIG. 10 infrastructure a total of fifty four rods 20 and twenty-six blocks 2 are necessary. Rigid frame members are constructed by inserting the ends of two rods 20 into opposing through-holes 10 of each block 2. Another block 2 is inserted onto the free ends of the rods 20 to complete the frame members. The mirrors can be mounted directly on the blocks. Moreover, the mirrors can be made adjustable by mounting them on one pivoting section in a set of identical block sections 30 and 40 (as in FIG. 9) all clamped together by an elongate assembly screw 321 for pivotal rotation. This way, necessary adjustments can be made easily by hand and without remanufacturing any custom parts per FIG. 1.

Figure 11:
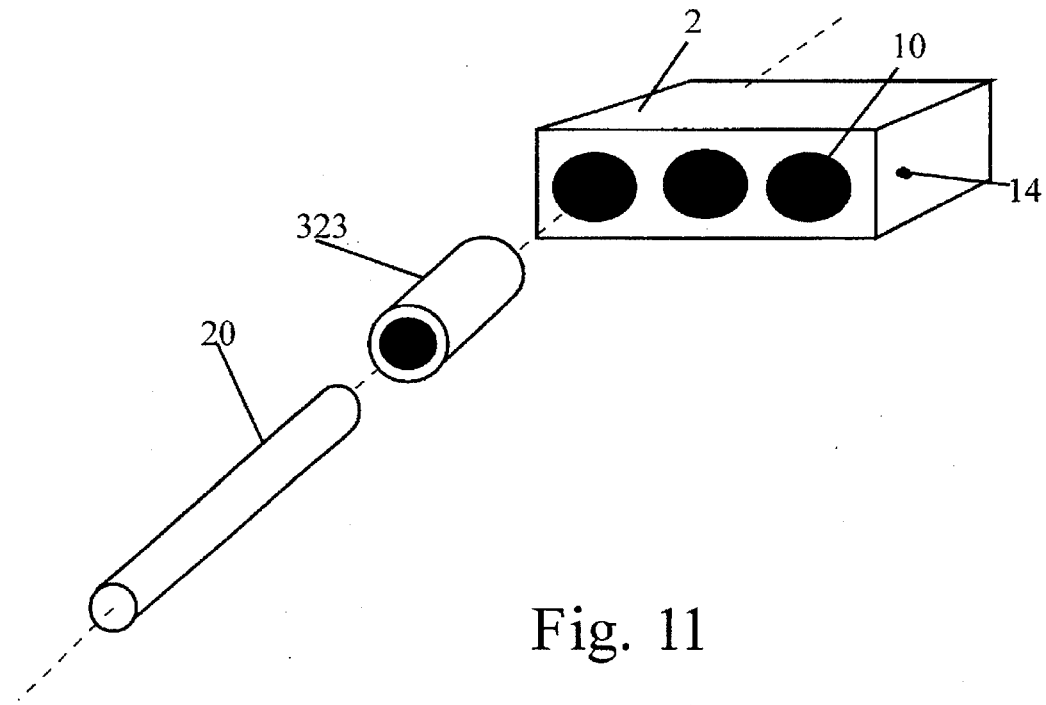
FIG. 11 is a perspective view of a rod 20 as in FIG. 5A for rotatable insertion lengthwise into the block 2 of FIG. 2 via a bearing sleeve 323.
Figure 12:
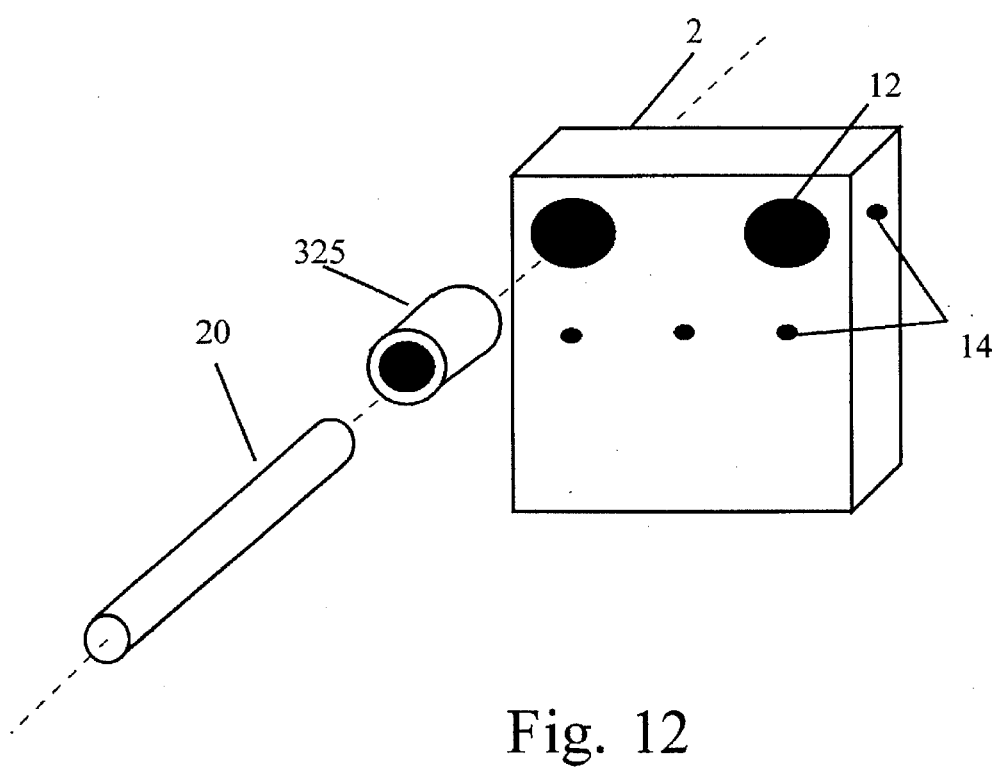
FIG. 12 is a perspective view of a rod 20 as in FIG. 5A for rotatable frontal insertion into the block 2 of FIG. 2 via a bearing sleeve 325.

FIGS. 11 and 12 illustrate the use of bearing sleeves to allow rods 20 to be slidably or rotatably fit into the block 2 of FIG. 2.

As seen in FIG. 11, the support block 2 is an exemplary 2"×2"×¾ unit with a hole arrangement including a first set of three through-holes 10 penetrating block 2 lengthwise. The first set of through-holes 10 are of a uniform diameter selected in order to frictionally receive a bearing bit 323. For the 2"×2"×¾" block, a ½" diameter hole is preferred. The bearing bit 323 may be any commercially available bearing bit of appropriate dimensions for facilitating axial sliding or rotation. For the 2"×2"×¾ block 2 with ½" diameter holes 10, a bearing bit 323 having a 2" length and ½" outer diameter is required. The diameter of rod 20 is sized in accordance with the interior diameter of bearing bit 323 for slidable insertion therein.

As seen in FIG. 12, the same exemplary 2"×2"×¾" support block 2 is used with the second set of two through-holes 12 penetrating block 2 from the front. Again, the second set of through-holes 12 are of a uniform diameter selected in order to frictionally receive a bearing bit 325. For the 2"×2"×¾" block, a ½" diameter hole is preferred. The bearing bit 325 is sized with appropriate dimensions for facilitating axial sliding or rotation. For the 2"×2"×¾" block with ½" diameter holes 12, a bearing bit 325 having a ¾" length and ½" outer diameter is required. The diameter of rod 20 is sized in accordance with the interior diameter of bearing bit 325 for slidable insertion therein. The use of bearing bits 323, 325 as described facilitates axial sliding or rotation of the rods 20, and this feature is especially useful in applications calling for rotation. Such applications may, for example, include movable and/or motorized infrastructures, and robotics applications.

The blocks and rods of the present invention are completely scalable for building infrastructures in range from microscopic to macroscopic. Although the system was designed for rapid prototyping of equipment infrastructures, the invention lies in the specific dimensions of, and hole layout of, the blocks. This gives the flexibility to erect a multitude of structures in minimum time, yet all using a uniform set of reusable components that can be just as quickly disassembled. Thus, in situ redesign iterations of an infrastructure can take place in real time or with a minimum of time and effort. It is contemplated that the block and rod system of the present invention will find application in other contexts, such as educational toys for children, modular furniture, etc. All are considered to be within the spirit and scope of the present invention.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. A support system for rapid assembly of component infrastructures, comprising:

a plurality of rods having a uniform circular cross-section; and a plurality of supporting blocks for interlocking said rods, each block further including, a first set of at least two evenly-spaced and parallel through-holes penetrating said block, each through-hole being sized to frictionally receive one of said rods, a second set of at least two evenly-spaced and parallel through-holes penetrating said block in a direction transverse to said first set of through-holes, said second through-holes also being sized to each frictionally receive one of said rods, and a third set of at least two evenly spaced and parallel clearance-holes adapted for the insertion of assembly screws for compressing said rods in said first set of through-holes and for securing pairs of said blocks in assembly.

2. The support system according to claim 1, wherein said first set of through-holes further comprises three through-holes.

3. The support system according to claim 2, wherein said second set of through-holes further comprises two through-holes.

4. The support system according to claim 1, wherein said first and second set of through-holes are of equal diameter.

5. The support system according to claim 1, wherein said plurality of blocks include blocks from among a group of blocks having a 2"×2"×0.75" dimension, a 1"×1"×0.375" dimension, and a 0.5×0.5"×0.25" dimension.

6. An adjustable infrastructure for rapid assembly of component infrastructures, comprising a plurality of rigid frame members each consisting of two supporting blocks having a first set of evenly-spaced and parallel through-holes penetrating said block, a second set of evenly-spaced and parallel through-holes penetrating said block in a direction transverse to said first set of through-holes, and a central clearance-hole penetrating said block and adapted for allowing a pair of said blocks to be pivotally secured together, and two rods having a uniform circular cross-section; inserted into opposing first or second sets of holes in said two supporting blocks.

7. The adjustable infrastructure for rapid assembly of component infrastructures according to claim 6, further comprising a third supporting block pivotally secured to one of said first and second supporting blocks by a assembly screw through said clearance holes, said third supporting block having equipment mounted thereon for pivotable adjustment.

8. A support system for rapid assembly of component infrastructures, comprising:

a plurality of rods having a uniform circular cross-section; and a plurality of supporting blocks for interlocking said rods, each block further including, a first partial-section formed with at least two evenly-spaced cylindrical channels traversing said block, said cylindrical channels being sized to seat one of said rods, a second partial-section formed with at least two evenly-spaced cylindrical channels traversing said block, said second partial-section being adapted to mate with said first partial-section such that said rods are sandwiched within said cylindrical channels, and at third set of at least two evenly-spaced and parallel central holes penetrating both of said first and second partial-sections for allowing said partial-sections to be clamped together by an assembly screw or the like.

9. The support system according to claim 8, wherein said first set of through-holes further comprises three through-holes in both of said first and second partial-sections.

10. The support system according to claim 9, wherein said second set of through-holes further comprises two through-holes in both of said first and second partial-sections.

11. A support system for rapid assembly of component infrastructures, comprising:

a plurality of tubes having a uniform circular cross-section; and a plurality of supporting blocks for interlocking said tubes, each block further including, a first set of at least two evenly-spaced and parallel through-holes penetrating said block, each through-hole being sized to frictionally receive one of said tubes, a second set of at least two evenly-spaced and parallel through-holes penetrating said block in a direction transverse to said first set of through-holes, said second through-holes also being sized to each frictionally receive one of said tubes, and a third set of at least two evenly spaced and parallel clearance holes adapted for the insertion of assembly screws for compressing said rods in said first set of through-holes and for securing pairs of said blocks in assembly.

12. The support system according to claim 11, wherein said first set of through-holes further comprises three through-holes.

13. The support system according to claim 12, wherein said second set of through-holes further comprises two through-holes.

14. The support system according to claim 11, wherein said first and second set of through-holes are of equal diameter.

15. The support system according to claim 11, wherein said plurality of blocks include blocks from among a group of blocks having a 2"×2"×0.75" dimension, a 1"×1"×0.375" dimension, and a 0.5"×0.5"×0.25" dimension.

16. The support system according to claim 11, wherein said tubes are formed from any one from among the group of rubber, plastic, PVC, metal and glass.

17. The support system according to claim 11, wherein said tubes contain optical fibers for transmission of ultraviolet, light or infrared energy.

18. The support system according to claim 11, wherein said tubes contain electrical wires for transmission of signals or electricity.

19. A support system for rapid assembly of component infrastructures, comprising:

a plurality of rods each having a uniform circular cross-section;

a plurality of bearing bits each having an interior diameter adapted for frictional insertion of one of said rods; and a plurality of supporting blocks for slidably or rotatably carrying said rods, each block further including a through-hole penetrating said block, said through-hole being sized to frictionally receive one of said bearing bits;

whereby said bearing bit may be frictionally inserted in said block, and said rod may be frictionally inserted in said bearing bit for free sliding or rotation with respect to said block.

* * * * *